US010298447B2

(12) United States Patent
Christopher et al.

(10) Patent No.: US 10,298,447 B2
(45) Date of Patent: May 21, 2019

(54) SYSTEM AND METHOD FOR ACCESSING REAL SENSORS FOR VIRTUAL SERVICE PROCESSOR STACK

(71) Applicant: American Megatrends, Inc., Norcross, GA (US)

(72) Inventors: Samvinesh Christopher, Suwanee, GA (US); Varadachari Sudan Ayanam, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 179 days.

(21) Appl. No.: 15/231,139

(22) Filed: Aug. 8, 2016

(65) Prior Publication Data

US 2018/0041386 A1 Feb. 8, 2018

(51) Int. Cl.
*H04L 12/24* (2006.01)
*G06F 9/455* (2018.01)
*G06F 13/42* (2006.01)

(52) U.S. Cl.
CPC ...... *H04L 41/0803* (2013.01); *G06F 9/45558* (2013.01); *G06F 13/4282* (2013.01); *H04L 41/0213* (2013.01); *H04L 41/12* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| 2006/0259731 | A1* | 11/2006 | Oshins | G06F 9/45537 711/173 |
| 2007/0253436 | A1* | 11/2007 | Henry | G06F 9/5077 370/401 |
| 2009/0013056 | A1* | 1/2009 | Weinstock | G06F 3/1462 709/208 |
| 2014/0047441 | A1* | 2/2014 | Miyauchi | G06F 11/2005 718/1 |
| 2016/0080210 | A1* | 3/2016 | Lai | G06F 13/20 709/224 |
| 2017/0364375 | A1* | 12/2017 | Ku | G06F 9/44505 |
| 2018/0307643 | A1* | 10/2018 | Zhang | G06F 13/10 |

* cited by examiner

*Primary Examiner* — Henry Tsai
*Assistant Examiner* — Christopher A Bartels
(74) *Attorney, Agent, or Firm* — Locke Lord LLP; Tim Tingkang Xia, Esq.

(57) ABSTRACT

Certain aspects direct to systems and methods for device or vendor independent network switch management on a management controller. The management controller is communicatively connected to a network switch through a Simple Network Management Protocol (SNMP) interface. The management controller receives parsed information of a management information base (MIB) file corresponding to the network switch, and establishes a communication between the management controller and the network switch through the SNMP interface based on the parsed information of the MIB file, in which the management controller functions as a client and the network switch functions as a server of the communication. Then the management controller receives an input to manage and configure the network switch, and manages and configures the network switch via the communication through the SNMP interface based on the input and the parsed information of the MIB file.

20 Claims, 4 Drawing Sheets

SYSTEM AND METHOD FOR ACCESSING REAL SENSORS FOR VIRTUAL SERVICE PROCESSOR STACK

FIELD

The present disclosure relates generally to service processor (SP) technology, and more particularly to systems and methods for adding real sensors for a virtual SP (VSP) stack, such as a virtual baseboard management controller (BMC) stack.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A service processor (SP) refers to a specialized microcontroller that manages the interface between system management software and platform hardware. An example of the SP may be a management controller, such as a baseboard management controller (BMC). The BMC can be embedded on the motherboard of a computer system, generally a server. For example, different types of sensors can be built into the computer system, and the BMC reads these sensors to obtain parameters such as temperature, cooling fan speeds, power status, operating system (OS) status, etc. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again.

In some cases, a virtual SP (VSP) or a virtual BMC stack may be provided on a normal server system without any hardware modification of the server system. However, the VSP or virtual BMC stack may require hardware components, such as an Application Specific Integrated Circuit (ASIC) or a field programmable gate array (FPGA), to implement the logic for accessing components of the computer system, such as the environmental sensors and controllers. This requires changes in the hardware components of the computer system, which increases the cost of the system.

Therefore, an unaddressed need exists in the art to address the aforementioned deficiencies and inadequacies.

SUMMARY

Certain aspects of the present disclosure direct to a system, which includes a computing device having a processor, a video controller and a storage device storing computer executable code. The video controller is configured to be connected to a display device, and to access a monitor memory of the display device via an Inter-Integrated Circuit (I2C) bus at a first address. The computer executable code includes a virtual service processor (VSP) stack, and the VSP stack, when executed at the processor, is configured to: emulate a service processor; define at least one device with at least one second address, wherein each of the at least one device corresponds to one of the at least one second address, and each of the at least one second address is different from the first address; and access the at least one device via the I2C bus at the second addresses.

In certain embodiments, the VSP stack is a virtual baseboard management controller (BMC) stack configured to emulate a BMC.

In certain embodiments, the computer executable code further includes a hypervisor configured to execute at the processor of the computing device to provide a first domain, wherein the VSP stack is configured to be executed in the first domain.

In certain embodiments, the at least one device includes a sensor, and the VSP stack is configured to receive a signal relating to operation or performance or health of the computing device from the sensor through the I2C bus.

In certain embodiments, the at least one device comprises a non-I2C device connected to a predetermined interface, and the VSP stack is configured to access the non-I2C device by: defining a conversion module for the non-I2C device with the second address for the non-I2C device; generating an access command for the non-I2C device, wherein the access command is in a first format compatible to the I2C bus; and sending an access command to the conversion module via the I2C bus, wherein the conversion module is configured to convert the access command from the first format to a second format compatible to the predetermined interface, and send the converted access command in the second format to the non-I2C device.

In certain embodiments, the predetermined interface is a general-purpose input/output (GPIO) line, a pulse-width modulation (PWM) interface, or an analog-to-digital converter (ADC) interface. In certain embodiments, the conversion module is a hardware component including an I2C to GPIO module, an I2C to PWM module, and an I2C to ADC module.

In certain embodiments, the video controller is a video graphics array (VGA) controller.

Certain aspects of the present disclosure direct to a method for accessing real sensors for a VSP stack. The method includes: executing the VSP stack at a processor of a computing device having a video controller to emulate a service processor, wherein the video controller is configured to be connected to a display device, and to access a monitor memory of the display device via an I2C bus at a first address; defining, by the executed VSP stack, at least one device with at least one second address, wherein each of the at least one device corresponds to one of the at least one second address, and each of the at least one second address is different from the first address; and accessing, by the executed VSP stack, the at least one device via the I2C bus at the second addresses.

In certain embodiments, the VSP stack is a virtual BMC stack configured to emulate a BMC.

In certain embodiments, a hypervisor configured to execute at the processor of the computing device to provide a first domain, and the VSP stack is configured to be executed in the first domain.

In certain embodiments, the at least one device includes a sensor, and the VSP stack is configured to receive a signal relating to operation or performance or health of the computing device from the sensor through the I2C bus.

In certain embodiments, the at least one device includes a non-I2C device connected to a predetermined interface, and the VSP stack is configured to access the non-I2C device by: defining a conversion module for the non-I2C device with the second address for the non-I2C device; generating an access command for the non-I2C device, wherein the access command is in a first format compatible to the I2C bus; and sending an access command to the conversion module via the I2C bus, wherein the conversion module is configured to convert the access command from the first format to a second format compatible to the predetermined interface, and send the converted access command in the second format to the non-I2C device. In certain embodiments, the predetermined interface is a GPIO line, a PWM interface or an ADC interface.

In certain embodiments, the video controller is a VGA controller.

Certain aspects of the present disclosure direct to a non-transitory computer readable medium storing computer executable code. In certain embodiments, the computer executable code includes a VSP stack, and the VSP stack, when executed at a processor of a computing device, is configured to: emulate a service processor for the computing device, wherein the computing device has a video controller configured to be connected to a display device, and to access a monitor memory of the display device via an I2C bus at a first address; define at least one device with at least one second address, wherein each of the at least one device corresponds to one of the at least one second address, and each of the at least one second address is different from the first address; and access the at least one device via the I2C bus at the second addresses.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
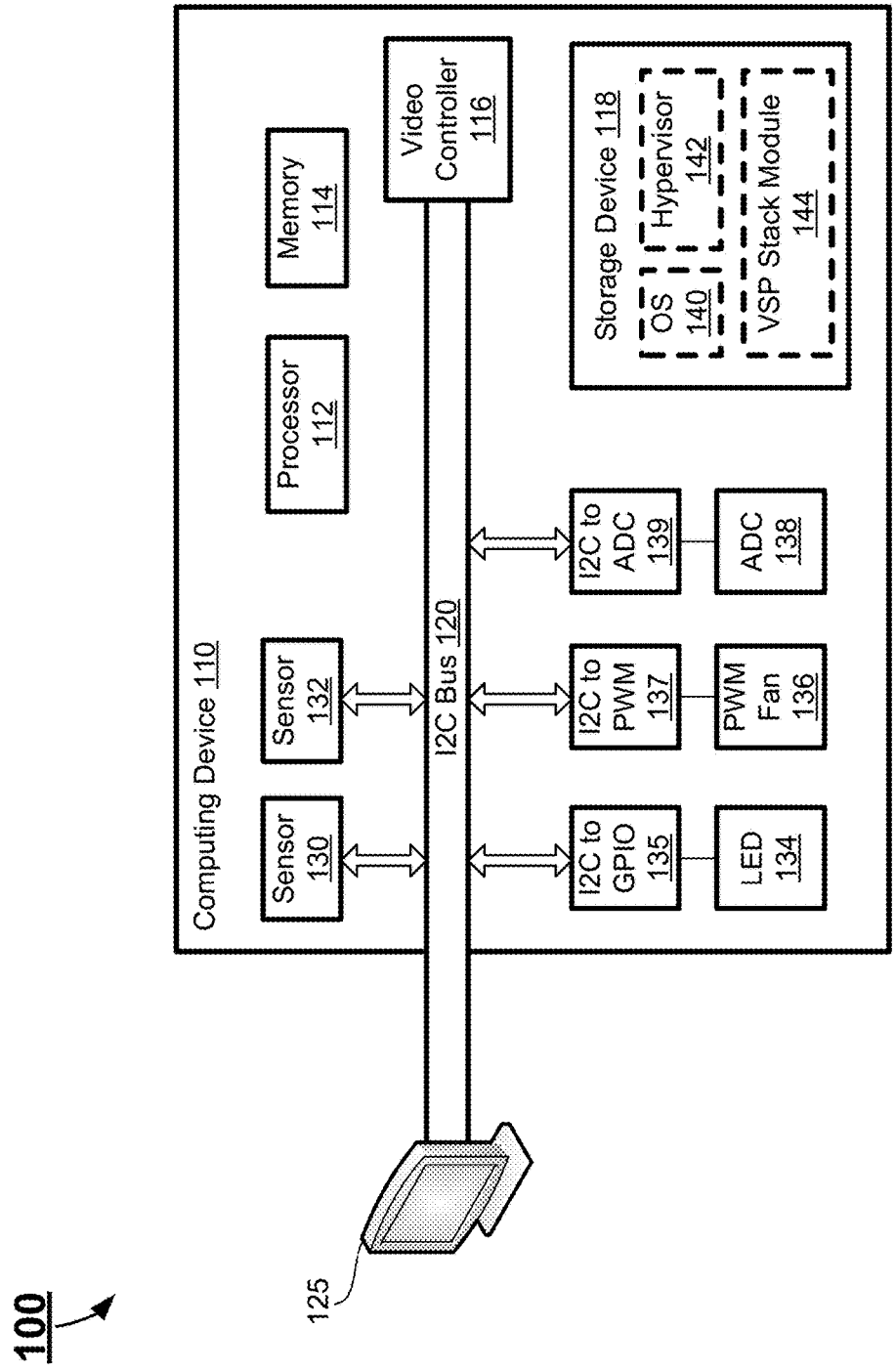
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on BMC simulator. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, in order to provide a VSP or a virtual BMC stack in a computer system, the VSP or virtual BMC stack may require hardware components, such as an ASIC or a FPGA, to implement the logic for accessing components of the computer system, such as the environmental sensors and controllers. This requires changes in the hardware components of the computer system, which increases the cost of the system. Thus, there is a need to implement the VSP or virtual BMC stack with the capabilities for accessing components of the computer system without the hardware components such as the ASIC or FPGA.

Certain aspects of the present disclosure direct to a system for accessing components of a computing device, such as sensors and other devices, for a VSP stack. In certain embodiments, the system adopts a non-intrusive method to implement the VSP stack without changing the hardware components. FIG. 1 schematically depicts a system according to certain embodiments of the present disclosure. In certain embodiments, the computing device 110 may be a standalone computer or one of the computers in an interconnected system. For example, the computing device 110 may be a general purpose computer, a specialized computer, or a server or a client in a client-server network. In certain embodiments, the computing device 110 may be a mobile device such as a laptop computer, a tablet computer, a hand-held computer, or any other types of computing device with computing functionalities. Indeed, the computing device 110 as shown in FIG. 1 only represents an exemplary embodiment of the present disclosure, and therefore should not be considered to limit the disclosure in any manner.

As shown in FIG. 1, the system 100 includes a computing device 110, which may be a general purpose computer, a specialized computer, a server, a mobile device such as a laptop computer, a smartphone or a tablet, or any other types of computing device. In certain embodiments, the computing device 110 may be a virtual machine (VM) server in a virtual desktop infrastructure (VDI) system to provide VDI services. As shown in FIG. 1, the computing device 110 includes a processor 112, a memory 114, a video controller 116, and a storage device 118 for storing the applications of the computing device 110, such as an operating system (OS) 140, a hypervisor 142, and a VSP stack module 144. Further, the computing device 110 includes an I2C bus 120, and a display device 125 is connected to the video controller 116 of the computing device 110 via the I2C bus 120. Further, the computing device 110 includes a plurality of devices to be accessed by the VSP, including a plurality of sensors 130 and 132, a light emitting diode (LED) 134, a pulse-width modulation (PWM) fan 136, and an analog-to-digital converter (ADC) 138. Moreover, the computing device 110 may include a plurality of conversion modules, including an I2C to GPIO module 135, an I2C to PWM module 137, and an I2C to ADC module 139. In certain embodiments, the computing device 110 may include other hardware components and software components (not shown) to perform its corresponding tasks. Examples of these hardware and software components may include, but not limited to, other required memory, interfaces, buses, Input/Output (I/O) modules and peripheral devices. It should be particularly noted that the computing device 110 does not require a hardware component, such as an ASIC or a FPGA, to store the VSP stack.

The processor 112 is configured to control operation of the computing device 110. In certain embodiments, the processor 112 may be a central processing unit (CPU). The processor 112 can execute any computer executable code or instructions, such as the OS 140, the hypervisor 142 and the VSP stack module 144, or other applications and instructions of the computing device 110. In certain embodiments, the computing device 110 may run on more than one processor, such as two processors, four processors, eight processors, or any suitable number of processors.

The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

The video controller 116, sometimes also referred to as a video display controller (VDC), is a controller responsible for generating video signals for display purposes. In certain embodiments, the video controller 116 is implemented by one or more IC chips. In certain embodiments, the video controller 116 is a video graphics array (VGA) controller, which has a 15-pin VGA connector to connect to the I2C bus 120. VGA is an analog computer display standard having an original VGA resolution of 640×480, but may be used and is widely adopted for high definition video, such as digital visual interface (DVI) or high-definition multimedia interface (HDMI). In certain embodiments, the video controller 116 may be connected to the display device 125. For proper display and resolution, the display device 125, which may be a VGA monitor, a DVI monitor or a HDMI monitor, needs to provide its display capabilities to the video controller 116. In order to achieve this feature, the display device 125 may include a nonvolatile monitor memory, such as an electrically erasable programmable read-only memory (EEPROM)

chip, which is programmed with the monitor details of the display device 125. The video controller 116 may access the monitor memory of the display device 125 via the I2C bus 120. In certain embodiments, the video controller 116 defines the monitor memory of the display device 125 with an I2C address (hereinafter the first address), e.g., the address 0x50, such that the monitor memory is accessible via the I2C bus 120 at the I2C address. In this case, the video controller 116 may access the monitor memory of the display device 125 via the I2C bus 120 at the first address 0x50 to obtain the monitor details of the display device 125.

The storage device 118 is a non-volatile data storage media for storing the applications of the computing device 110. Examples of the storage device 118 may include non-volatile memory such as flash memory, memory cards, USB drives, hard drives, floppy disks, optical drives, or any other types of data storage devices. In certain embodiments, the computing device 110 may have multiple storage devices 118, which may be identical storage devices or different types of storage devices, and the OS 140, the hypervisor 142, the VSP stack module 144 and other applications of the computing device 110 may be stored in one or more of the storage devices 118 of the computing device 110. In certain embodiments, the storage device 118 may store other applications independent from the firmware 160.

The applications stored in the storage device 118, such as the OS 140, the hypervisor 142, the VSP stack module 144 and other applications, may include computer executable code or instructions executable at the processor 112. In certain embodiments, each of the applications or modules may further include sub-modules. Alternatively, in certain embodiments, some or all of the applications or modules may be combined to form a single module.

The OS 140 is a collective management software application managing the operation of the computing device 110. For example, the OS 140 can include a set of functional programs that control and manage operations of the devices connected to the computing device 110. The set of application programs provide certain utility software for the user to manage the computing device 110. In certain embodiments, the OS 140 is operable to multitask, i.e., execute computing tasks in multiple threads. Examples of the OS 140 may be any of the commercial operating systems. For example, the OS 140 may be MICROSOFT CORPORATION's WINDOWS 95, WINDOWS CE, WINDOWS 98, WINDOWS 2000 or WINDOWS NT, WINDOWS Vista, WINDOWS 7, and WINDOWS 8 operating systems, IBM's OS/2 WARP, APPLE's MACINTOSH OSX operating system, LINUX, UNIX, etc.

The hypervisor 142 is a program that allows multiple VM instances to run simultaneously and share a single hardware host, such as the computing device 110. The hypervisor 142, when executed at the processor 112 of the computing device 110 or any other processor, implements hardware virtualization techniques and allows one or more operating systems or other applications to run concurrently as guests of one or more virtual machines on the host computer (i.e., the computing device 110). In certain embodiments, the hypervisor 142 can be of various types and designs, such as MICROSOFT HYPER-V, XEN, VMWARE ESX, or other types of hypervisors suitable for the iVDI system 100.

The VSP stack module 144 is a VM module running on the hypervisor 142 for providing VSP functionalities. In certain embodiments, the VSP stack module 144 is a virtual baseboard management controller (BMC) stack configured to emulate a BMC. In certain embodiments, when the VSP stack module 144 runs on the hypervisor 142 to provide a VSP instance, the VSP instance emulates a service processor for the computing device 110. Further, the VSP instance also defines a plurality of devices, including the sensors 130 and 132 and the conversion modules 135, 137 and 139, with a plurality of I2C addresses (hereinafter the second addresses) different from the first address for the monitor memory of the display device 125, such that each of the devices is defined with a corresponding second address.

Figure 2:
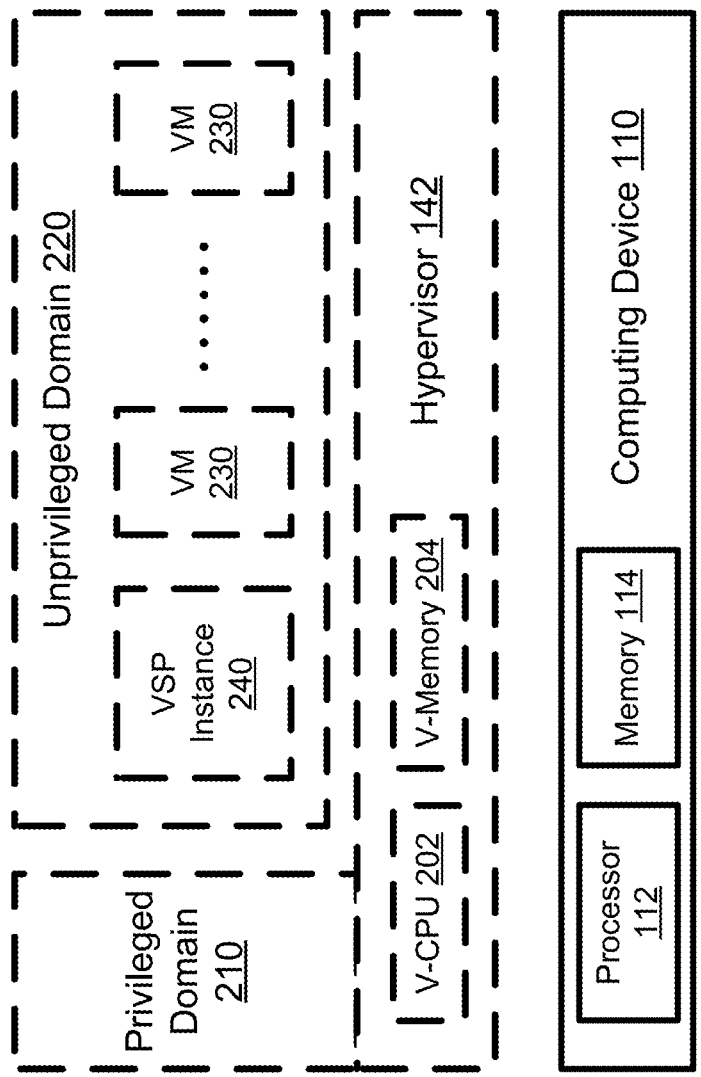
FIG. 2 schematically depicts execution of the VSP stack module according to certain embodiments of the present disclosure.

FIG. 2 schematically depicts the execution of the VSP stack module on the system according to certain embodiments of the present disclosure. As shown in FIG. 2, when the hypervisor 142 runs on the computing device 110, the hypervisor instance emulates a virtual computer machine, including a virtual CPU 202 and a virtual memory 204. The hypervisor instance also emulates a plurality of domains, including a privileged domain 210 and an unprivileged domain 220 for the VMs. In certain embodiments, a plurality of VM's 230, including the VSP instance 240, can run in the unprivileged domain 220 as if they are running directly on a physical computer.

Referring back to FIG. 1, the I2C bus 120 is a multi-master, multi-slave, single-ended, serial computer bus, which is typically used for attaching lower-speed peripheral ICs to processors and microcontrollers in short-distance, intra-board communication. Typically, the I2C bus 120 is provided on the baseboard or motherboard of the computing device 110, and is dedicated for the video controller 116 to access the monitor memory of the display device 125 only. In other words, the I2C bus 120 is not exposed outside and cannot be accessed by external components of the computing device 110. However, with the VSP instance defining the devices (i.e., the sensors 130 and 132 and the conversion modules 135, 137 and 139) with the second addresses, the VSP instance may have access to the devices via the I2C bus 120.

The sensors 130 and 132 are hardware components provided in the computing device 110 for monitoring purposes. For example, each of the sensors 130 and 132 may respectively generate a signal relating to operation or performance or health of the computing device 110, and the VSP instance 240 may receive the signals from the sensors 130 and 132 through the I2C bus 120. Typically, most of the sensors for hardware monitoring may be accessible via the I2C bus 120. As described above, each of the sensors 130 and 132 may be respectively assigned by the VSP instance 240 with a unique second address, such that the sensors 130 and 132 may be accessible by the VSP instance via the I2C bus 120.

The LED 134 is a semiconductor light source, which may be provided to emit light for signaling purposes. Typically, the LED 134 may be accessible via the GPIO lines, but not via the I2C bus 120 directly. In other words, the LED 134 is a non-I2C device. Thus, the I2C to GPIO module 135 may be provided as a conversion module to convert a command for the LED 134 from the I2C compatible format to the GPIO format. In certain embodiments, the I2C to GPIO module 135 may be implemented by a low cost hardware component, such as a PC8575 chip or other hardware components. As described above, the I2C to GPIO module 135 may be assigned by the VSP instance with a unique second address, such that the I2C to GPIO module 135 may be accessible by the VSP instance via the I2C bus 120.

The PWM fan 136 is an electric fan provided for cooling of the components of the computing device 110. As modern computers grow more powerful, so do their requirements for electrical power, and computers convert one part of this electrical power into heat generated by all major components. Thus, fans may be needed to circulate cooling air through the components of the computers. Typically, the control input of the PWM fan 136 is a PWM input signal. However, the PWM fan 136 is not directly accessible via the I2C bus 120. In other words, the PWM fan 136 is a non-I2C device. Thus, the I2C to PWM module 137 may be provided as a conversion module to convert a command (i.e., the input signal) for the PWM fan 136 from the I2C compatible format to the PWM format. In certain embodiments, the I2C to PWM module 137 may be implemented by a low cost hardware component, such as a MAX31790 PWM output controller or other hardware components. As described above, the I2C to PWM module 137 may be assigned by the VSP instance with a unique second address, such that the I2C to PWM module 137 may be accessible by the VSP instance via the I2C bus 120.

The ADC 138 is an electronic device for converting analog signals (usually voltage) to digital numbers that represent the amplitudes of the signals. Typically, the ADC 138 is not directly accessible via the I2C bus 120. In other words, the ADC 138 is a non-I2C device. Thus, the I2C to ADC module 139 may be provided as a conversion module to convert a command for the ADC 138 from the I2C compatible format to the ADC format. In certain embodiments, the I2C to ADC module 139 may be implemented by a low cost hardware component, such as a LTC2309 successive approximation ADC with an I2C interface, or other hardware components. As described above, the I2C to ADC module 139 may be assigned by the VSP instance with a unique second address, such that the I2C to ADC module 139 may be accessible by the VSP instance via the I2C bus 120.

In certain embodiments, when the VSP stack module 144 runs on the hypervisor 142 to provide the VSP instance, the VSP instance defines a plurality of devices, such as the sensors 130 and 132, with their corresponding second addresses. Thus, the VSP instance may access the sensors 130 and 132 via the I2C bus 120 with their corresponding second addresses. For the non-I2C devices, such as the LED 134, the PWM fan 136 and the ADC 138, the VSP instance may define their corresponding conversion modules, such as the I2C to GPIO module 135, the I2C to PWM module 137 and the I2C to ADC module 139, with the corresponding second addresses. Thus, the VSP instance may generate corresponding access commands for the non-I2C device in a first format compatible to the I2C bus 120, and then send the access commands to the corresponding conversion modules via the I2C bus 120 with the corresponding second addresses. Thus, each of the conversion modules 135, 137 and 139 may convert the access command from the first format to a second format compatible to the corresponding interfaces (GPIO, PWM or ADC), and send the converted access command in the second format to the non-I2C devices, such as the LED 134, the PWM fan 136 and the ADC 138. In this case, any number of devices may be added to the system and become accessible by the VSP instance via the I2C bus 120 with the corresponding second addresses, as long as each of the second addresses is different from the first address (e.g., 0x50) being used by the monitor memory of the display device 125.

Figure 3:
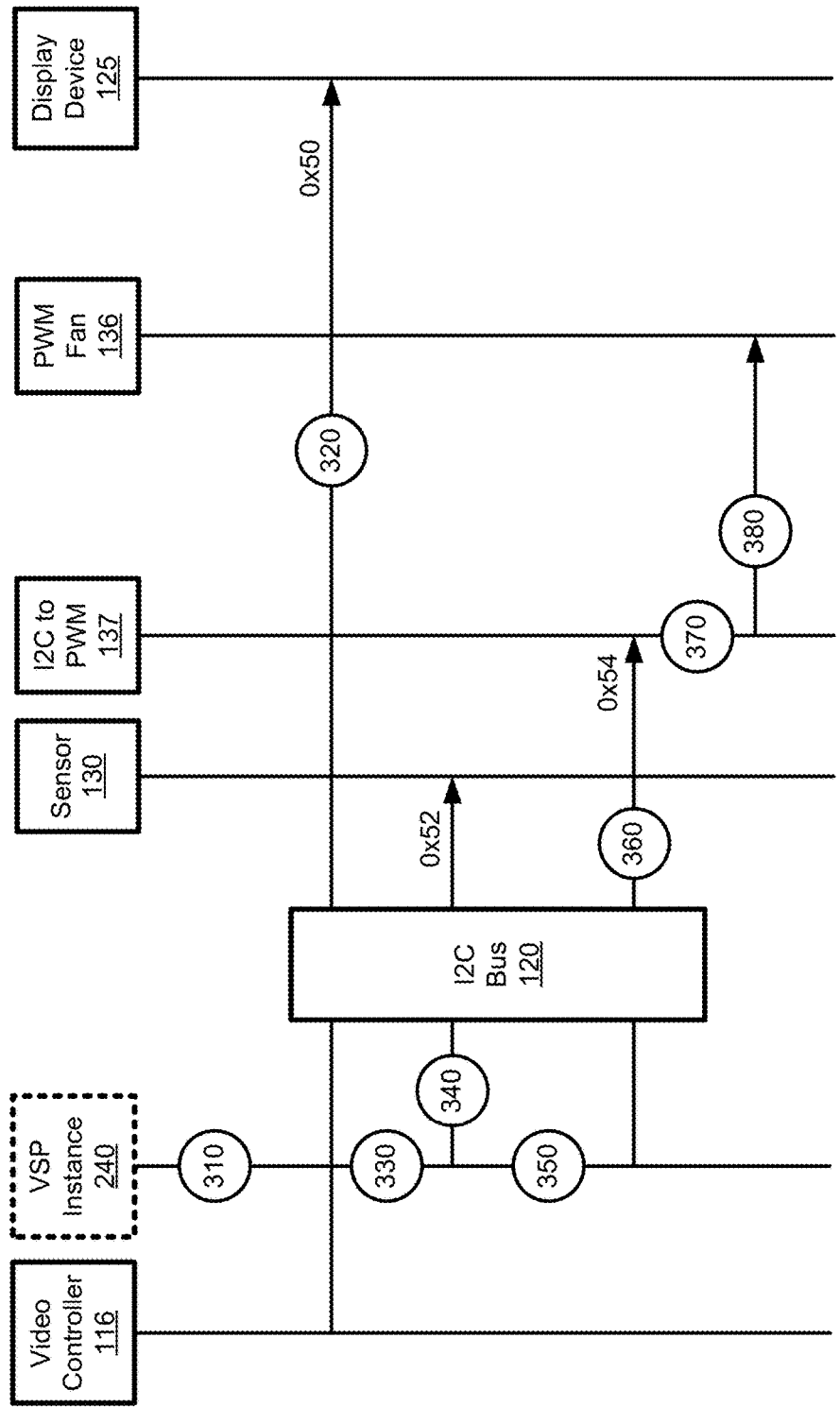
FIG. 3 depicts a flowchart showing data flow between the VSP stack and the devices being accessed according to certain embodiments of the present disclosure.

FIG. 3 depicts a flowchart showing data flow between the VSP stack and the devices being accessed according to certain embodiments of the present disclosure. In certain embodiments, the process as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 310, when the VSP stack module 144 runs on the hypervisor 142 to form the VSP instance 240, the VSP instance 240 may emulate a service processor, and define the available devices with corresponding second addresses, which are respectively different from the first address (e.g., 0x50) of the monitor memory of the display device 125. For example, FIG. 3 shows that the devices include a sensor 130 and a PWM fan 136 (which is a non-I2C device). Thus, the VSP instance 240 may define the sensor 130 to have a second address of 0x52, and define the I2C to PWM module 137 (i.e., the conversion module for the PWM fan 136) to have a second address of 0x54. It should be noted that the first address (0x50) and the second addresses (0x52 and 0x54) are merely used as examples of the I2C addresses, and the actual I2C addresses being used to define the monitor memory of the display device 125 and the devices may be different.

At procedure 320, when the video controller 116 attempts to obtain the information of the display device 125, the video controller 116 may access the monitor memory of the display device 125 via the I2C bus 120 with the first address 0x50 in order to obtain the information stored in the monitor memory of the display device 125.

At procedure 330, when the VSP instance 240 attempts to access the sensor 130, the VSP instance 240 may generate an access command for the sensor 130 at the second address 0x52. At procedure 340, the VSP instance 240 may, based on the access command, access the sensor 130 via the I2C bus 120 at the second address 0x52.

At procedure 350, when the VSP instance 240 attempts to access the PWM fan 136, the VSP instance 240 may generate an access command for the I2C to PWM module 137 (i.e., the conversion module for the PWM fan 136) at the second address 0x54. In certain embodiments, the access command is in a format compatible to the I2C bus 120. At procedure 360, the VSP instance 240 may, based on the access command, send the access command to the I2C to PWM module 137 (i.e., the conversion module for the PWM fan 136) via the I2C bus 120 at the second address 0x54. At procedure 370, upon receiving the access command, the I2C to PWM module 137 converts the access command from the I2C compatible format to a PWM compatible format. At procedure 380, the I2C to PWM module 137 sends the converted access command in the second format to the PWM fan 136 for further processing.

Figure 4:
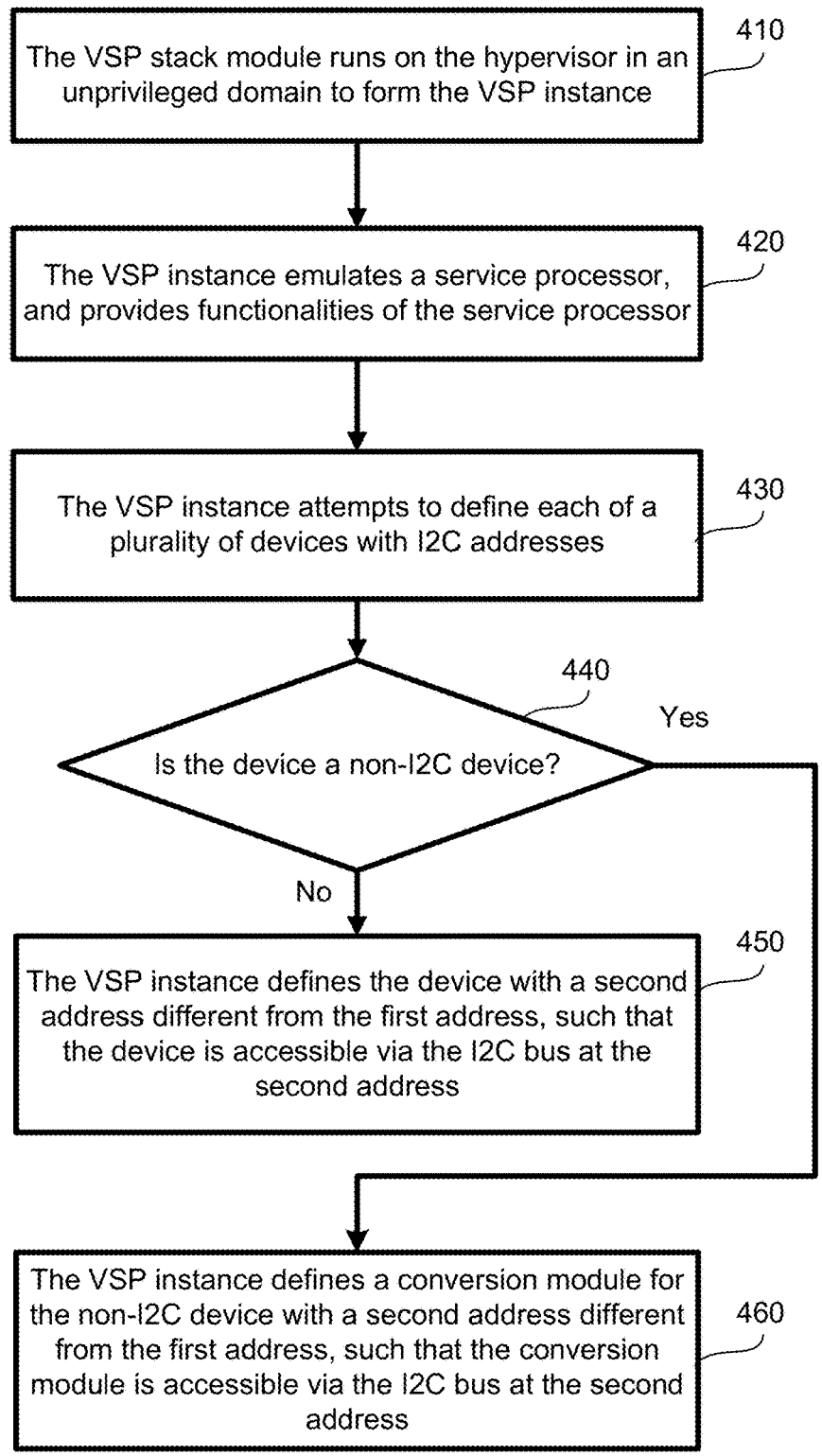
FIG. 4 depicts a flowchart showing a method for accessing devices for the VSP stack according to certain embodiments of the present disclosure.

A further aspect of the present disclosure is directed to a method for accessing real sensors for a VSP stack. FIG. 4 depicts a flowchart showing a method for accessing devices for the VSP stack according to certain embodiments of the present disclosure. In certain embodiments, the method as shown in FIG. 4 may be implemented on a system as shown in FIG. 1. It should be particularly noted that, unless otherwise stated in the present disclosure, the steps of the method may be arranged in a different sequential order, and are thus not limited to the sequential order as shown in FIG. 4.

As shown in FIG. 4, at procedure 410, the VSP stack module 144 is executed on the hypervisor 142 in an unprivileged domain to form the VSP instance 240. At procedure 420, the VSP instance 240 emulates a service processor, and provides functionalities of the service processor.

At procedure 430, the VSP instance 240 attempts to define a plurality of devices with I2C addresses. Specifically, each of the devices may be assigned with a second address different from the first address (i.e., 0x50) of the monitor memory of the display device 125.

At procedure 440, for each of the devices to be defined, the VSP instance 240 determines whether the device is a non-I2C device. When the device is compatible to I2C (e.g., the sensors 130 and 132), at procedure 450, the VSP instance 240 may define the device with a second address different from the first address, such that the device is accessible via the I2C bus 120 at the second address. On the other hand, when the device is a non-I2C device (e.g., the LED 134, the PWM fan 136, or the ADC 138), at procedure 460, the VSP instance 240 may define a conversion module (e.g., the I2C to GPIO module 135, the I2C to PWM module 137, or the I2C to ADC module 139) for the non-I2C device with a second address different from the first address, such that the conversion module is accessible via the I2C bus 120 at the second address. Thus, the VSP instance 240 may access the device via the I2C bus 120.

It should be particularly noted that, in the embodiments of the system and the method as described above, the computing device 110 does not require a hardware component, such as an ASIC or a FPGA, to store the VSP stack. However, when the VSP instance needs to access non-I2C devices, additional hardware components may be added to the computing device 110 to serve as the conversion modules for the non-I2C devices. These hardware components are generally low cost hardware components in comparison to the ASIC or FPGA, allowing the system and the method to be implemented cost-effectively.

In a further aspect, the present disclosure is related to a non-transitory computer readable medium storing computer executable code. The computer executable code, when executed at one or more processer, may perform the method as described above. In certain embodiments, the computer executable code includes the VSP stack module 144 as described above. In certain embodiments, the non-transitory computer readable medium may include, but not limited to, any physical or virtual storage media. In certain embodiments, the non-transitory computer readable medium may be implemented as the storage device 118 of the computing device 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
    a computing device having:
        a processor;
        a video controller connected to a display device, wherein the video controller is configured to access a monitor memory of the display device via an Inter-Integrated Circuit (I2C) bus at a first address; and
        a storage device storing computer executable code;
    wherein the computer executable code comprises a virtual service processor (VSP) stack, and the VSP stack, when executed at the processor, is configured to:
        emulate a service processor;
        define at least one device with at least one second address, wherein each of the at least one device corresponds to one of the at least one second address, the first address and the at least one second address are I2C bus addresses, and each of the at least one second address is different from the first address; and
        access the at least one device via the I2C bus at the at least one second address;
    wherein the system does not include a physical service processor.

2. The system as claimed in claim 1, wherein the VSP stack is a virtual baseboard management controller (BMC) stack configured to emulate a BMC.

3. The system as claimed in claim 1, wherein the computer executable code further comprises:
    a hypervisor configured to execute at the processor of the computing device to provide a first domain;
    wherein the VSP stack is configured to be executed in the first domain.

4. The system as claimed in claim 1, wherein the at least one device comprises a sensor, and the VSP stack is configured to receive a signal relating to operation or performance or health of the computing device from the sensor through the I2C bus.

5. The system as claimed in claim 1, wherein the at least one device comprises a non-I2C device connected to a predetermined interface, and the VSP stack is configured to access the non-I2C device by:
    defining a conversion module for the non-I2C device with the second address for the non-I2C device;
    generating an access command for the non-I2C device, wherein the access command is in a first format compatible to the I2C bus; and
    sending an access command to the conversion module via the I2C bus, wherein the conversion module is configured to convert the access command from the first format to a second format compatible to the predetermined interface, and send the converted access command in the second format to the non-I2C device.

6. The system as claimed in claim 5, wherein the predetermined interface is a general-purpose input/output (GPIO) line, a pulse-width modulation (PWM) interface, or an analog-to-digital converter (ADC) interface.

7. The system as claimed in claim 6, wherein the conversion module is a hardware component comprising an I2C to GPIO module, an I2C to PWM module, and an I2C to ADC module.

8. The system as claimed in claim 1, wherein the video controller is a video graphics array (VGA) controller.

9. A method for accessing real sensors for a virtual service processor (VSP) stack, the method comprising:
    executing the VSP stack at a processor of a computing device of a system to emulate a service processor, wherein the computing device has a video controller connected to a display device, and the video controller is configured to access a monitor memory of the display device via an Inter-Integrated Circuit (I2C) bus at a first address;
    defining, by the executed VSP stack, at least one device with at least one second address, wherein each of the at least one device corresponds to one of the at least one second address, the first address and the at least one second address are I2C bus addresses, and each of the at least one second address is different from the first address; and accessing, by the executed VSP stack, the at least one device via the I2C bus at the at least one second address;

wherein the system does not include a physical service processor.

10. The method as claimed in claim 9, wherein the VSP stack is a virtual baseboard management controller (BMC) stack configured to emulate a BMC.

11. The method as claimed in claim 9, wherein a hypervisor configured to execute at the processor of the computing device to provide a first domain, and the VSP stack is configured to be executed in the first domain.

12. The method as claimed in claim 9, wherein the at least one device comprises a sensor, and the VSP stack is configured to receive a signal relating to operation or performance or health of the computing device from the sensor through the I2C bus.

13. The method as claimed in claim 9, wherein the at least one device comprises a non-I2C device connected to a predetermined interface, and the VSP stack is configured to access the non-I2C device by:

defining a conversion module for the non-I2C device with the second address for the non-I2C device;

generating an access command for the non-I2C device, wherein the access command is in a first format compatible to the I2C bus; and sending an access command to the conversion module via the I2C bus, wherein the conversion module is configured to convert the access command from the first format to a second format compatible to the predetermined interface, and send the converted access command in the second format to the non-I2C device;

wherein the predetermined interface is a general-purpose input/output (GPIO) line, a pulse-width modulation (PWM) interface, or an analog-to-digital converter (ADC) interface.

14. The method as claimed in claim 9, wherein the video controller is a video graphics array (VGA) controller.

15. A non-transitory computer readable medium storing computer executable code, wherein the computer executable code comprises a virtual service processor (VSP) stack, and the VSP stack, when executed at a processor of a computing device of a system, is configured to:

emulate a service processor for the computing device, wherein the computing device has a video controller connected to a display device, and the video controller is configured to access a monitor memory of the display device via an Inter-Integrated Circuit (I2C) bus at a first address;

define at least one device with at least one second address, wherein each of the at least one device corresponds to one of the at least one second address, the first address and the at least one second address are I2C bus addresses, and each of the at least one second address is different from the first address; and access the at least one device via the I2C bus at the at least one second address;

wherein the system does not include a physical service processor.

16. The non-transitory computer readable medium as claimed in claim 15, wherein the VSP stack is a virtual baseboard management controller (BMC) stack configured to emulate a BMC.

17. The non-transitory computer readable medium as claimed in claim 15, wherein the computer executable code further comprises:

a hypervisor configured to execute at the processor of the computing device to provide a first domain;

wherein the VSP stack is configured to be executed in the first domain.

18. The non-transitory computer readable medium as claimed in claim 15, wherein the at least one device comprises a sensor, and the VSP stack is configured to receive a signal relating to operation or performance or health of the computing device from the sensor through the I2C bus.

19. The non-transitory computer readable medium as claimed in claim 15, wherein the at least one device comprises a non-I2C device connected to a predetermined interface, and the virtual BMC stack is configured to access the non-I2C device by:

defining a conversion module for the non-I2C device with the second address for the non-I2C device;

generating an access command for the non-I2C device, wherein the access command is in a first format compatible to the I2C bus; and sending an access command to the conversion module via the I2C bus, wherein the conversion module is configured to convert the access command from the first format to a second format compatible to the predetermined interface, and send the converted access command in the second format to the non-I2C device;

wherein the predetermined interface is a general-purpose input/output (GPIO) line, a pulse-width modulation (PWM) interface, or an analog-to-digital converter (ADC) interface.

20. The non-transitory computer readable medium as claimed in claim 15, wherein the video controller is a video graphics array (VGA) controller.

* * * * *